(12) United States Patent
Kim et al.

(10) Patent No.: US 9,139,757 B2
(45) Date of Patent: Sep. 22, 2015

(54) COMPOSITION FOR FORMING ELECTRONIC PAPER WITHOUT PARTICLE FREEZING, AND ADHESIVE FILM PREPARED THEREBY

(71) Applicant: LG Hausys, Ltd., Seoul (KR)

(72) Inventors: Jang Soon Kim, Seongnam-si (KR); Yong Hoon Lee, Cheongju-si (KR); Won Gu Choi, Anyang-si (KR)

(73) Assignee: LG HAUSYS, LTD., Seoul (KR)

( * ) Notice: Subject to any disclaimer, the term of this patent is extended or adjusted under 35 U.S.C. 154(b) by 0 days.

(21) Appl. No.: 14/349,242

(22) PCT Filed: Oct. 18, 2012

(86) PCT No.: PCT/KR2012/008531
§ 371 (c)(1),
(2) Date: Apr. 2, 2014

(87) PCT Pub. No.: WO2013/058570
PCT Pub. Date: Apr. 25, 2013

(65) Prior Publication Data
US 2014/0256841 A1    Sep. 11, 2014

(30) Foreign Application Priority Data
Oct. 18, 2011    (KR) .................. 10-2011-0106478

(51) Int. Cl.
| C07D 303/40 | (2006.01) |
| C08G 65/18 | (2006.01) |
| C08F 2/46 | (2006.01) |
| C08G 61/04 | (2006.01) |
| C09J 163/00 | (2006.01) |
| C09J 4/00 | (2006.01) |
| C09J 181/00 | (2006.01) |
| G02F 1/167 | (2006.01) |

(52) U.S. Cl.
CPC .... *C09J 163/00* (2013.01); *C09J 4/00* (2013.01); *C09J 181/00* (2013.01); *G02F 1/167* (2013.01); G02F 2001/1672 (2013.01)

(58) Field of Classification Search
CPC .......... C09J 4/00; C09J 163/00; C09J 181/00; G02F 2001/1672; G02F 1/167
USPC ................... 522/170, 168, 1; 520/1
See application file for complete search history.

(56) References Cited

U.S. PATENT DOCUMENTS

| 5,721,289 A * | 2/1998 | Karim et al. .................. 522/31 |
| 2008/0045619 A1 * | 2/2008 | Jackson et al. ................ 522/32 |
| 2008/0158488 A1 * | 7/2008 | Yanai et al. .................. 349/107 |
| 2011/0001190 A1 * | 1/2011 | Ide et al. ...................... 257/347 |

FOREIGN PATENT DOCUMENTS

| CN | 1839187 A | | 9/2006 |
| CN | 101465408 A | | 6/2009 |
| JP | 11-095233 | * | 4/1999 |
| JP | 2003238904 A | | 8/2003 |
| JP | 2009544785 A | | 12/2009 |
| JP | 2011162691 A | | 8/2011 |
| JP | 2011175053 A | | 9/2011 |
| KR | 100427195 B1 | | 8/2004 |
| KR | 10-2009-0033252 | * | 4/2009 |
| KR | 20090033252 A | | 4/2009 |
| KR | 20110050711 A | | 5/2011 |

OTHER PUBLICATIONS

Otsuka, JP 11-095233 Machine Translation, Apr. 9, 1999.*
Jyang et al, KR 10-2009-0033252 Machine Translation, Apr. 1, 2009.*
EPON data, 2011.*
International Search Report for PCT/KR2012/008531 mailed on Mar. 18, 2013, citing the above reference(s).
Chinese Office Action dated Dec. 31, 2014, citing the above reference(s).
Japanese Office Action dated Jan. 27, 2015, citing the above reference(s).

* cited by examiner

*Primary Examiner* — Ling Choi
*Assistant Examiner* — Jessica E Whiteley
(74) *Attorney, Agent, or Firm* — Lowe Hauptman & Ham, LLP

(57) ABSTRACT

Disclosed is a sealing film for electronic paper having a multilayered structure. The multilayered film for electronic paper comprising a layered structure according to the present invention comprises: (a) a sealing layer formed with a material comprising a UV curable polymer resin composition or a UV transmitting polymer resin composition; and (b) a tack-free adhesive layer formed with a material comprising a UV curable polymer resin. The sealing film has excellent sealing properties and is tack-free at room temperature, and thus it is possible to minimize freezing of electrostatic particles inside a microcup sticking to the surface of a sealing material during manipulation thereof.

11 Claims, 4 Drawing Sheets

COMPOSITION FOR FORMING ELECTRONIC PAPER WITHOUT PARTICLE FREEZING, AND ADHESIVE FILM PREPARED THEREBY

CROSS REFERENCE TO RELATED APPLICATION

This application claims the priority of Korean Patent Application No. 10-2011-0106478 filed on Oct. 18, 2011 in the Korean Patent and Trademark Office. Further, this application is the National Phase application of International Application No. PCT/KR2012/008531 filed on Oct. 18, 2012, which is incorporated herein by reference in its entirety.

TECHNICAL FIELD

The present invention relates to a composition for forming an adhesive film for electronic paper without particle freezing, and an adhesive film prepared therefrom. More particularly, the present invention relates to a composition for forming an adhesive film for electronic paper, which is tack-free after curing and thus does not suffer from particle freezing, which causes charged particles inside an electronic paper ink to stick to an adhesive film, thereby providing high reliability and excellent sealing performance, and an adhesive film prepared therefrom.

BACKGROUND ART

Recently, an electronic paper apparatus using a technique, such as electrophoresis or electrochromic, thermal, dichroic particle rotation methods, and the like, has been actively developed as an image display capable of replacing a liquid crystal display.

Since such an electronic paper apparatus secures wider viewing angle, close to that of general printed matter, than liquid crystal displays, provides low power consumption, and is economical, it is anticipated that many next generation image displays will include such electronic paper.

The electronic paper apparatus is operated by two representative methods. Here, one is a method of operating the apparatus by filling a microcapsule with ink and the other is a method of operating the apparatus by filling a microcup with an ink. In particular, the microcup method has merits in that a preparation method is simple and it is possible to allow most processes to be performed in-line.

A microcup type electronic paper apparatus has a structure as shown in FIG. 1. In the structure, microcups 10 having a height of 15 μm to 30 μm and a length and width of 5 μm to 180 μm are arranged, and charged particles (typically, titanium dioxide) are dispersed in an organic solvent inside each of the cups 10.

The microcup type electronic paper apparatus includes ITO electrodes 30 disposed on upper and lower sides of the microcups 10, such that, when voltage is applied to the ITO electrodes 30, the charged particles dispersed in the organic solvent are arranged to realize black, white or other colors.

In the microcup type electronic paper apparatus, partition walls 15 are formed to prevent horizontal movement of the charged particles.

Such partition walls 15 serve to separate pixels and to maintain a space of the microcup. In addition, when the microcup type electronic paper apparatus is applied to a flexible display, the partition walls 15 must be kept bonded to the upper and lower ITO electrodes 30 without detachment even when the apparatus is bent, while serving as a supporter maintaining the space of the microcup.

Otherwise, when the electronic paper apparatus is bent, the partition walls 15 are frequently detached from the upper and lower ITO electrodes 30. In this case, since the charged particles placed in each pixel space move to other adjacent cups 10, image quality becomes unstable and the pixel is deteriorated, thereby causing increase in product failure.

Thus, the microcup type electronic paper apparatus includes a sealing material 20 disposed between the ITO electrode 30 and the microcups 10. The partition walls 15 and the ITO electrode 30 must be bonded to each other well via the sealing material 20 such that the solvent and the charged particles confined in the microcup 10 do not leak from the microcups 10.

FIGS. 2a to 2c are sectional views showing operation of bonding the ITO electrode 30 of the electronic paper apparatus to the partition walls 15.

First, FIG. 2a shows a method in which the organic solvent and the sealing material incompatible with the organic solvent are introduced into the microcups 10, followed by final curing when the sealing material gathers at upper sides of the microcups 10 due to phase separation between the sealing material and the solvent, thereby forming the sealing material 20.

FIG. 2b shows a method in which the sealing material 20 is coated onto upper surfaces of the partition walls 15, followed by bonding the ITO electrode 30 to the partition walls 15, and FIG. 2c shows a method in which the sealing material 20 is coated onto an overall surface of the ITO electrode 30, followed by bonding the ITO electrode 30 to the partition walls 15. That is, the sealing material 20 is coated onto the upper surfaces of the partition walls 15 or the entire surface of the upper ITO electrode 30 using a roller, and the upper ITO electrode 30 is then stacked on the partition walls 15, followed by curing the sealing material 20 through UV irradiation of the upper ITO electrode 30, thereby bonding the partition walls 15 to the upper ITO electrode 30.

However, to apply the sealing material 20 to the microcup type electronic paper apparatus, the sealing material 20 must be able to embed the partition walls 15 therein and exhibit exact interfacial separation through phase separation due to poor compatibility with ink. Thus, the method illustrated in FIG. 2a has a problem of low reliability.

In addition, the methods illustrated in FIGS. 2b to 2c have problems in that the liquid sealing material dissolves in the organic solvent inside the microcups before curing to widely spread, causing blurring of the pixel space, or in that the charged particles stick to the sealing material due to tack at room temperature to influence charge states, causing unstable operation of the apparatus.

FIG. 3 shows a typical sealing film 100. In the typical sealing film 100, a sealing layer 1 is formed as a single layer on a release layer 3. For the sealing film 100, a composition exhibiting high peel strength is generally used to improve sealing performance between the sealing layer 1 and the partition walls of the microcups. In this case, tack of the sealing layer 1 causes a particle freezing phenomenon wherein the charged particles inside the microcup stick thereto, thereby deteriorating optical properties. In addition, when the sealing layer 1 is formed of a tack-free composition at room temperature to prevent particle freezing, the sealing layer does not have improved sealing performance, although optical properties can be satisfied, thereby making it difficult to satisfy long-term durability.

DISCLOSURE

Technical Problem

The present invention is conceived to resolve the above problems, and it is an aspect of the present invention to provide a composition for forming an adhesive film for electronic paper, which is tack-free after curing and thus does not suffer from particle freezing, which causes charged particles inside an electronic paper ink to stick to an adhesive film, thereby providing high reliability and excellent sealing performance, and an adhesive film prepared therefrom.

Technical Solution

In accordance with one aspect of the present invention, a composition for forming an adhesive film for electronic paper includes: (a) a thiol compound-containing free radical polymerizable composition; and (b) a cation-initiated polymerizable composition.

In accordance with another aspect of the present invention, a method for preparing an adhesive film for electronic paper includes: (i) preparing a mixture by mixing a thiol compound-containing free radical polymerizable composition with a cation-initiated polymerizable composition; (ii) thermally curing only the thiol compound-containing free radical polymerizable composition to obtain a semi-cured composition by heating the mixture to 50° C. to 200° C.; and (iii) curing the cation-initiated polymerizable composition by irradiation of the semi-cured composition.

In accordance with a further aspect of the present invention, an adhesive film for electronic paper is prepared using a composition including: (a) a thiol compound-containing free radical polymerizable composition; and (b) a cation-initiated polymerizable composition.

Advantageous Effects

The composition for forming an adhesive film for electronic paper according to embodiments of the present invention secures semi-curability allowing partial curing by heat first and capabilities of embedding partition walls with an uncured component, and can be completely cured by irradiation, thereby securing tack-free adhesion and thus minimizing particle freezing.

BEST MODE

The above and other aspects, features, and advantages of the present invention will become apparent from the detailed description of the following embodiments in conjunction with the accompanying drawings. It should be understood that the present invention is not limited to the following embodiments and may be embodied in different ways, and that the embodiments are provided for complete disclosure and a thorough understanding of the present invention by those skilled in the art. The scope of the present invention is defined only by the claims.

Figure 1:
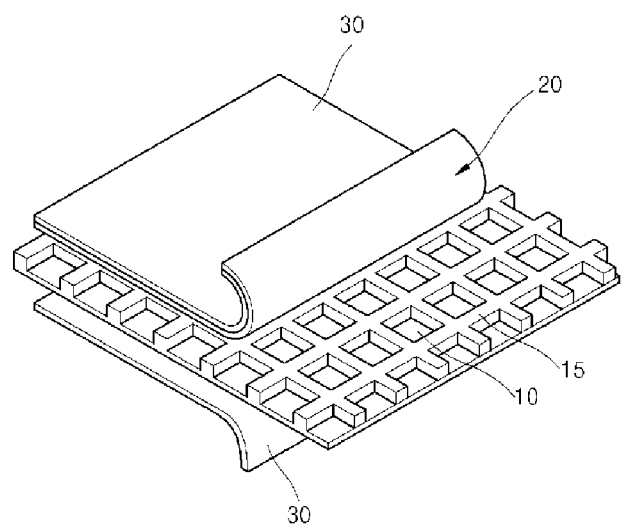
FIG. 1 is a diagram of a microcup type electronic paper apparatus.
Figure 2A:
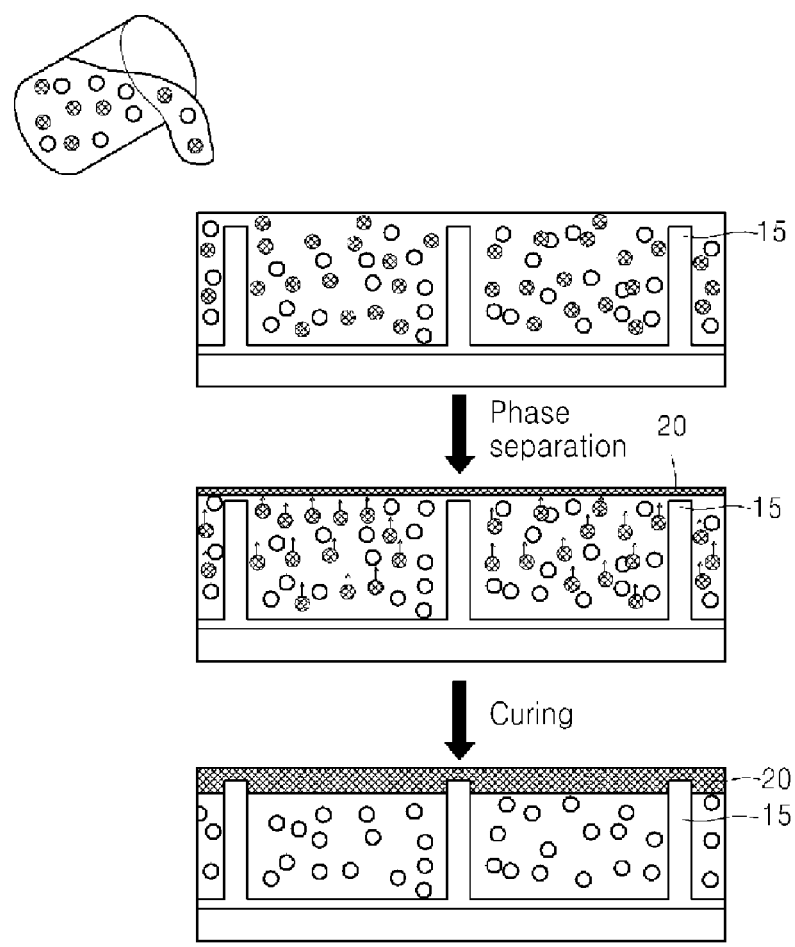
FIG. 2 shows sectional views showing operation of bonding an ITO electrode of an electronic paper apparatus to partition walls thereof.
Figure 2B:
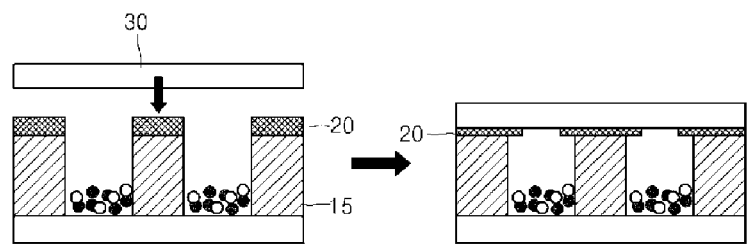
Figure 2C:
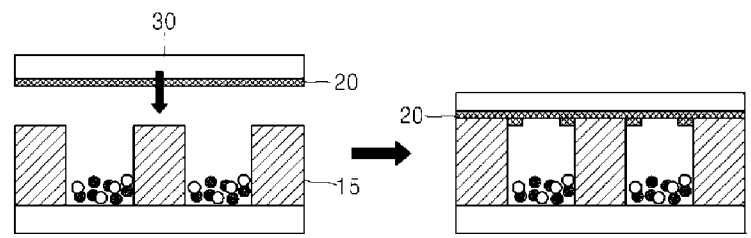
Figure 3:
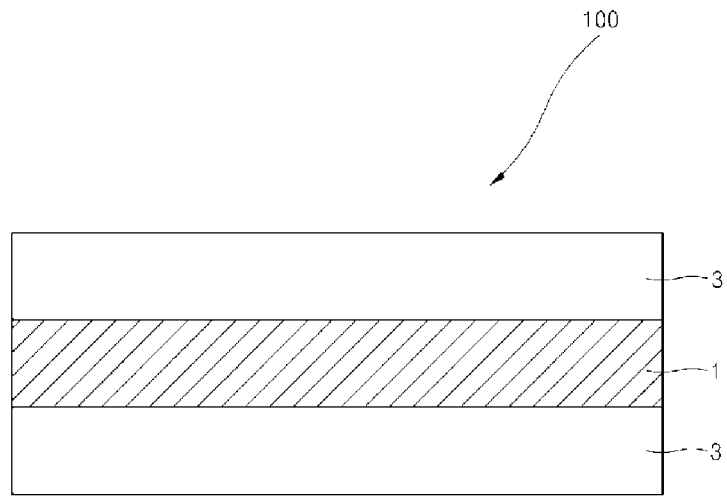
FIG. 3 is a sectional view of a sealing film for electronic paper coated with a general adhesive composition.
Figure 4:
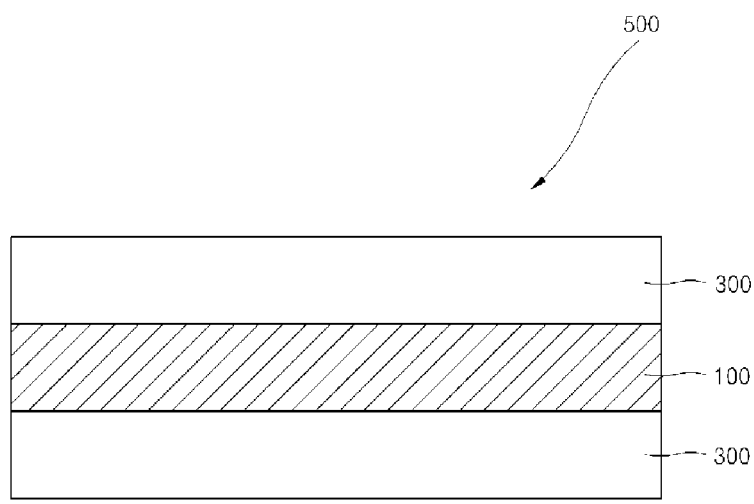
FIG. 4 is a sectional view of an adhesive film for electronic paper coated with a composition for forming adhesive films according to one embodiment of the present invention.

FIG. 4 shows an adhesive film for electronic paper coated with a composition for forming adhesive films according to one embodiment of the present invention. First, a composition for forming an adhesive film for electronic paper according to embodiments of the present invention will be described in detail.

Composition for Forming Adhesive Film for Electronic Paper

According to embodiments of the present invention, the composition for forming an adhesive film for electronic paper includes: (a) a thiol compound-containing free radical polymerizable composition; and (b) a cation-initiated polymerizable composition.

(a) Thiol Compound-containing Free Radical Polymerizable Composition

According to the invention, the free radical polymerizable composition may include a thiol compound. The thiol compound may be a polythiol compound having at least two —SH functional groups.

Examples of the polythiol compound may include methanedithiol, ethanedithiol, propanedithiol, 1,6-hexanedithiol, 1,2,3-trimercaptopropane, tetrakis(mercaptomethyl)methane, cyclohexanedithiol, 2,2-dimethylpropane-1,3-dithiol, 3,4-dimethoxybutane-1,2-dithiol, 2-methylcyclohexane-2,3-dithiol, bis(mercaptomethyl)cyclohexane, 2,3-dimercapto-1-propanol(2-mercaptoacetate), diethylene glycol bis(2-mercaptoacetate), diethylene glycol bis(3-mercaptopropionate), 1,2-dimercaptopropylmethyl ether, 2,3-dimercaptopropylmethyl ether, 2,2-bis(mercaptomethyl)-1,3-propanedithiol, bis(2-mercaptoethyl) ether, ethylene glycol bis(2-mercaptoacetate), ethylene glycol bis(3-mercaptopropionate), trimethylolpropane tris(2-mercaptoacetate), trimethylolpropane tris(3-mercaptopropionate), pentaerythritol tetrakis(2-mercaptoacetate), pentaerythritol tetrakis(3-mercaptopropionate), 1,2-bis(2-mercaptoethylthio)-3-mercaptopropane, bis(mercaptomethyl)sulfide, bis(mercaptoethyl)sulfide, bis(mercaptopropyl)sulfide, bis(mercaptomethylthio)methane, bis(2-mercaptoethylthio)methane, bis(3-mercaptopropyl) methane, 1,2-bis(mercaptomethylthio)ethane, 1,2-(2-mercaptoethylthio)ethane, 1,2-(3-mercaptopropyl)ethane, 1,3-bis(mercaptomethylthio)propane, 1,3-bis(2-mercaptoethylthio)propane, 1,3-bis(3-mercaptopropylthio)propane, 1,2-bis(2-mercaptoethylthio)-3-mercaptopropane, 2-mercaptoethylthio-1,3-propanedithiol, 1,2,3-tris(mercaptomethylthio)propane, 1,2,3-tris(2-mercaptoethylthio)propane, 1,2,3-tris(3-mercaptopropylthio)propane, tetrakis(mercaptomethylthiomethyl)methane, tetrakis(2-mercaptoethylthiomethyl)methane, tetrakis(3-mercaptopropylthiomethyl)methane, bis(mercaptomethyl) disulfide, bis(mercaptoethyl)disulfide, tris[3-mercaptopropionyloxy)-ethyl]isocyanurate, bis(mercaptomethyl)-3,6,9-trithia-1,11-undecanedithiol, bis(1,3-dimercapto-2-propyl)sulfide, 3,4-thiophenedithiol, tetrahydrothiophene-2,5-dimercaptomethyl, 2,5-dimercapto-1,3,4-thiadiazole, 2,5-dimercapto-1,4-dithiane, 2,5-bis(mercaptomethyl)-1,4-dithiane, and 2,5-bis(mercaptoethyl)-1,4-dithiane, without being limited thereto so long as the compound has at least two —SH functional groups.

Among the above compounds, particularly in terms of adhesion, pot life and curing time, the polythiol compound preferably includes at least one selected from among bis(mercaptomethyl)-1,4-dithiane, bis(mercaptoethyl)sulfide, bis(mercaptoethyl)disulfide, 1,2-bis(mercaptoethyl)thio-3- mercaptopropane, pentaerythritol tetrakismercaptoacetate, pentaerythritol tetrakis(3-mercaptopropionate), trimethylolpropane trismercaptoacetate, trimethylolpropane trismercaptopropionate and trimercaptopropane, and tris[(3-mercaptopropionyloxy)-ethyl]isocyanurate.

According to the invention, the (a) thiol compound-containing free radical polymerizable composition may include a polyene compound and a thermal initiator in addition to the polythiol compound.

First, the polyene compound may be any compound without limitation so long as the compound has at least two carbon-carbon double bonds in a molecular structure thereof. Examples of the polyene compound may include allyl alcohol derivatives, ester compounds of (meth)acrylic acid and polyvalent alcohol, urethane acrylate, and the like.

Examples of the allyl alcohol derivatives may include triallyl isocyanurate, diallyl adipate, diallyl phthalate, glycerin diallyl ether, trimethylolpropane diallyl ether, pentaerythritol, diallyl ether, and the like.

Examples of the polyvalent alcohol used in the ester compounds of (meth)acrylic acid and polyvalent alcohol may include ethylene glycol, propylene glycol, 1,4-butanediol, 1,6-hexanediol, glycerin, trimethylolpropane, pentaerythritol, sorbitol, and the like.

In particular, in terms of adhesion, curing time and chemical resistance after curing, the polyene compound preferably includes at least one selected from among triallyl isocyanurate, diallyl adipate, diallyl phthalate, glycerin diallyl ether, trimethylolpropane diallyl ether, pentaerythritol, and diallyl ether, which are the allyl alcohol derivatives.

The thermal initiator may include at least one selected from among azo, peroxide, persulfate, and oxidation-reduction compounds.

The azo thermal initiator may include 2,2'-azobis(4-methoxy-2,4-dimethylvaleronitrile) (VAZO 33), 2,2'-azobis(2-amidinopropane)dihydrochloride (VAZO 50), 2,2'-azobis(2,4-dimethylvaleronitrile) (VAZO 52), 2,2'-azobis(isobutyronitrile)(VAZO 64), 2,2'-azobis-2-methylbutyronitrile (VAZO 67), 1,1'-azobis(1-cyclohexanecarbonitrile) (VAZO 88), 2,2'-azobis(methyl isobutyrate) (V-601), and the like.

The peroxide thermal initiator may include benzoyl peroxide, acetyl peroxidelauroyl peroxide, decanoyl peroxide, dicetyl peroxycarbonate, di(4-t-butylcyclohexyl) peroxycarbonate (PERKADOX 16S, available from Akzo Chemicals CO., Ltd.), di(2-ethylhexyl) peroxycarbonate, t-butyl peroxypivalate (Lupersol 11, available from Atochem Co., Ltd.), t-butylperoxy-2-ethylhexanoate (Trigonox 21-C5O, available from Akzo Chemicals CO., Ltd.), dicumyl peroxide, and the like.

The persulfate thermal initiator may include potassium persulfate, sodium persulfate, ammonium persulfate, and the like.

The oxidation-reduction thermal initiator may include: the persulfate initiators and reductants, for example, mixtures of sodium metabisulfite and sodium bisulfite; systems including organic peroxide and t-amine as a main component, for example, mixtures of benzoyl peroxide and dimethylaniline; systems including organic hydroperoxide and transition metals as a main component, for example, mixtures of cumene hydroperoxide and cobalt naphthenate; and the like.

According to the invention, the (a) thiol compound-containing free radical polymerizable composition may include 10 parts by weight to 90 parts by weight of the thiol compound, and 90 parts by weight to 10 parts by weight of the polyene compound based on 100 parts by weight of the (a) thiol compound-containing free radical polymerizable composition. In addition, the (a) thiol compound-containing free radical polymerizable composition may include 0.1 parts by weight to 10 parts by weight of the thermal initiator based on 100 parts by weight of a mixture of the thiol and polyene compounds.

If the amount of the thiol compound is less than 10 parts by weight, the adhesive film can become extremely hard after curing and thus can break, and if the amount of the thiol compound exceeds 90 parts by weight, the adhesive film can become extremely soft after curing and thus can exhibit low chemical resistance.

In addition, if the amount of the polyene compound is less than 10 parts by weight, the adhesive film can become extremely soft after curing and thus can exhibit low chemical resistance and deterioration in long-term reliability, and if the amount of the polyene compound exceeds 90 parts by weight, the adhesive film has short curing time. In this case, however, the adhesive film can become extremely hard after curing and thus can break when bent.

Further, if the amount of the thermal initiator is less than 0.1 parts by weight, the adhesive film has long curing time or severely small semi-curing fraction by thermal curing and thus can suffer from a handling problem, and if the amount of the thermal initiator exceeds 10 parts by weight, the adhesive film can suffer from a handling problem due to extremely short pot-life and can exhibit low sealing performance due to extremely large semi-curing fraction.

According to the invention, although the (a) thiol compound-containing free radical polymerizable composition may have any mixing ratio of the thiol compound to the polyene compound without limitation, the (a) thiol compound-containing free radical polymerizable composition preferably has a molar ratio of thiol groups of the thiol compound to carbon-carbon double bonds of the polyene compound from 0.05:0.95 to 0.95:0.05, more preferably of 1:1.

(b) Cation-initiated Polymerizable Composition

According to the invention, the (b) cation-initiated polymerizable composition includes an epoxy compound and a cationic polymerization initiator.

The epoxy compound has a softening point of less than 90° C. Although the epoxy compound may be any epoxy compound without limitation so long as the epoxy compound reacts with a thiol compound at room temperature to form a gel and thus cause no problem in pot life during coating, the epoxy compound has a softening point within this range.

Examples of the epoxy compound may include bisphenol A epoxy, bisphenol F epoxy, halogenated epoxy, novolac epoxy, alicyclic epoxy, glycidyl ester, glycidyl amine, and the like. The epoxy compound has softening point varying with molecular weight, that is, chemical structure and equivalent weight of epoxy.

When the epoxy compound is mixed with the (a) thiol compound-containing free radical polymerizable composition, followed by thermally curing the (a) free radical polymerizable composition, any reaction does not occur, thereby maintaining the mixed composition in a semi-cured state.

Here, since the mixed composition in a semi-cured state exhibits tack at room temperature due to the epoxy compound having a softening point of less than 90° C., the mixed composition exhibits adhesion for sealing.

If the epoxy compound has a softening point of greater than 90° C., the mixed composition does not exhibit tack, and the adhesive film can break or crack when bent, although the adhesive film exhibits good adhesion after curing.

In addition, viscosity of the epoxy compound does not matter so long as the epoxy compound dissolves in the solvent.

According to the invention, the (b) cation-initiated polymerizable composition includes a cationic polymerization initiator.

The cationic polymerization initiator initiates cationic polymerization and may include: strong acids such as $H_2SO_4$, $HClO_4$, and HCl; Lewis acids, such as $BF_3$, $BCl_3$, $BF_3$:O $(C_2H_5)_2$, $TiCl_4$, $AlCl_4$ and $SnCl_4$, and complexes thereof; and other easily ionizable compounds. In particular, the cationic polymerization initiator is preferably an aromatic iodonium salt containing a metal halide anion.

Here, the metal halide anion may include at least one selected from among $BF_4^-$, $PF_6^-$, $AsF_6^-$, and $SbF_6^-$.

According to the invention, the (b) cation-initiated polymerizable composition may include 0.1 parts by weight to 10 parts by weight of the cationic polymerization initiator based on 100 parts by weight of the epoxy compound. If the amount of the cationic polymerization initiator is not within this range, the composition has difficulty in securing stable adhesion upon irradiation.

According to the invention, the (a) thiol compound-containing free radical polymerizable composition and the (b) cation-initiated polymerizable composition are mixed in a weight ratio of 1:0.1 to 1:9.0. If the weight ratio is not within this range, the composition has problems in control of radiation curing time and adhesion after curing, and can suffer from particle freezing due to tack after curing.

Method for Preparing Adhesive Film for Electronic Paper and Adhesive Film

FIG. 4 show an adhesive film for electronic paper coated with a composition for forming adhesive films according to one embodiment of the present invention.

Referring to FIG. 4, an adhesive film 500 for electronic paper according to the embodiment may include: an adhesive layer 100 including the composition for forming an adhesive film according to the invention; and a release film 300, wherein the adhesive film 500 is prepared by laminating the adhesive layer 100 on an upper side of the release film 300. More specifically, the adhesive layer including the composition for forming an adhesive film is prepared by (i) preparing a mixture by mixing a thiol compound-containing free radical polymerizable composition with a cation-initiated polymerizable composition; (ii) thermally curing only the thiol compound-containing free radical polymerizable composition to obtain a semi-cured composition by heating the mixture to 50° C. to 200° C.; and (iii) curing the cation-initiated polymerizable composition by irradiation of the semi-cured composition.

Here, thermal curing may be performed at a temperature from 50° C. to 200° C. If the temperature is less than 50° C., there is a problem of extremely low semi-curing fraction, and if the temperature is higher than 200° C., there is a problem of low embedding performance due to extremely high semi-curing fraction.

Since the composition for forming an adhesive film is the same as described above, detailed descriptions of the composition will be omitted.

The release film 300 may be any film without limitation so long as the film can be easily peeled off such that no residual adhesive remains upon separation of the adhesive layer 100. For example, the release film 300 may be a polyethylene terephthalate (PET) film coated with a silicone release agent or a fluorine release agent.

Since the release film 300 should not be distorted by heat when the adhesive layer 100 is dried with hot air, the release film 300 may be a release agent-coated polyimide film, a release agent-coated poly(naphthalene terephthalate) film or the like depending on drying temperature.

The adhesive film for electronic paper according to the embodiments of the invention has been described. Hereinafter, the present invention will be explained in more detail with reference to some examples. It should be understood that these examples are not to be in any way construed as limiting the present invention.

EXAMPLES AND COMPARATIVE EXAMPLES

To evaluate embedding performance, chemical resistance and particle freezing of the adhesive film for electronic paper according to the invention, compositions for forming an adhesive film for electronic paper according to Examples and Comparative Examples were prepared and evaluated as to the following properties.

Each composition prepared by mixing a free radical polymerizable composition with a cation-initiated polymerizable composition according to a composition ratio as listed in Table 1 was coated onto a 50 μm thick PET release film to a thickness of 10 μm and then subjected to drying and thermal aging for 24 hours, followed by curing through UV irradiation, thereby forming a coating layer including the adhesive composition for electronic paper.

TABLE 1

|  | (a) Free radical polymerizable composition | (b) Cation-initiated polymerizable composition | Composition ratio of (a) to (b) |
| --- | --- | --- | --- |
| Example 1 | 1) 60 parts by weight of pentaerythritoltetrakis(3-mercaptopropionate) <br> 2) 40 parts by weight of triallyl isocyanurate <br> 3) 1.5 parts by weight of V-70 based on 100 parts by weight of 1) + 2) | 1) 100 parts by weight of alicyclic epoxy resin (RAR934, Royce Co., Ltd., softening point: 80° C.) <br> 2) 1.5 parts by weight of iodonium salt PF6 | 1:2 |
| Example 2 | 1) 50 parts by weight of tris[3-mercaptopropionyloxy)-ethyl]isocyanurate <br> 2) 50 parts by weight of triallyl isocyanurate <br> 3) 2.5 parts by weight of V-70 based on 100 parts by weight of 1) + 2) | 1) 100 parts by weight of bisphenol-F epoxy (YD011, ADITYA BIRLA Co., Ltd., softening point: 65° C.) <br> 2) 1.5 parts by weight of iodonium salt PF6 | 1:1.5 |
| Example 3 | 1) 40 parts by weight of pentaerythritoltetrakis(3-mercaptopropionate) <br> 2) 60 parts by weight of triallyl isocyanurate | 1) 100 parts by weight of bisphenol-F epoxy (YD011, ADITYA BIRLA Co., Ltd., softening point: 65° C.) <br> 2) 2.5 parts by weight of | 1:2 |

TABLE 1-continued

|  | (a) Free radical polymerizable composition | (b) Cation-initiated polymerizable composition | Composition ratio of (a) to (b) |
|---|---|---|---|
|  | 3) 3.0 parts by weight of VAZO-33 based on 100 parts by weight of 1) + 2) | iodonium salt BF4 |  |
| Example 4 | 1) 30 parts by weight of bis(mercaptomethyl)-1,4-dithiane<br>2) 70 parts by weight of diallyl adipate<br>3) 1.0 part by weight of VAZO-33 based on 100 parts by weight of 1) + 2) | 1) 100 parts by weight of alicyclic epoxy (RAR934, Royce Co., Ltd., softening point: 80° C.)<br>2) 2.5 parts by weight of sulfonium salt BF4 | 1:0.5 |
| Example 5 | 1) 70 parts by weight of bis(mercaptoethyl)disulfide<br>2) 30 parts by weight of pentaerythritol<br>3) 1.5 parts by weight of V-601 based on 100 parts by weight of 1) + 2) | 1) 100 parts by weight of alicyclic epoxy (RAR934, Royce Co., Ltd., softening point: 80° C.)<br>2) 1.5 parts by weight of sulfonium salt SbF6 | 1:0.2 |
| Comparative Example 1 | 1) 60 parts by weight of pentaerythritoltetrakis(3-mercaptopropionate)<br>2) 40 parts by weight of triallyl isocyanurate<br>3) 1.5 parts by weight of V-70 based on 100 parts by weight of 1) + 2) |  | 1:0 |
| Comparative Example 2 | 1) 60 parts by weight of pentaerythritoltetrakis(3-mercaptopropionate)<br>2) 40 parts by weight of triallyl isocyanurate<br>3) 1.5 parts by weight of V-70 based on 100 parts by weight of 1) + 2) | 1) 100 parts by weight of novolac epoxy (CER-3000L, Nippon Kayaku Co., Ltd., softening point: 93° C.)<br>2) 1.5 parts by weight of iodonium salt PF6 | 1:5 |
| Comparative Example 3 | 1) 60 parts by weight of pentaerythritoltetrakis(3-mercaptopropionate)<br>2) 40 parts by weight of triallyl isocyanurate<br>3) 1.5 parts by weight of V-70 based on 100 parts by weight of 1) + 2) | 1) 100 parts by weight of bisphenol-F epoxy resin (softening point: 30° C.)<br>2) 1.5 parts by weight of iodonium salt PF6 | 1:0.05 |

Evaluation of Properties

1. Embedding Performance

Peel strength was measured on the adhesive layer formed on the PET film using each of the compositions shown in Table 1. Results are shown in Table 2.

2. Chemical Resistance

One drop of hexane, which is used as an organic solvent for electronic paper, was dropped onto the adhesive layer formed on the PET film using each of the compositions of Table 1 using a pipette, followed by observing whether blurring occurred after 10 minutes. Results are shown in Table 2.

3. Particle Freezing

Probe tack energy was measured on the adhesive layer formed on the PET film using each of the compositions of Table 1. Results are shown in Table 2.

TABLE 2

|  | Embedding performance (g/in) | Chemical resistance | Probe tack energy (g · mm) |
|---|---|---|---|
| Example 1 | 524 | No blurring | 0.20 |
| Example 2 | 527 | No blurring | 0.30 |
| Example 3 | 517 | No blurring | 0.34 |
| Example 4 | 510 | No blurring | 0.28 |
| Example 5 | 505 | No blurring | 0.41 |
| Comparative Example 1 | 378 | No blurring | 0.10 |
| Comparative Example 2 | 412 | No blurring | 0.86 |
| Comparative Example 3 | 405 | No blurring | 0.89 |

Although the present invention has been described with reference to some embodiments in conjunction with the accompanying drawings, it should be understood that the foregoing embodiments are provided for illustrative purposes only, and that various modifications, changes, alterations, and equivalent embodiments can be made by those skilled in the art without departing from the spirit and scope of the invention. Therefore, the scope of the invention should be limited only by the accompanying claims and equivalents thereof.

The invention claimed is:

1. A composition for forming an adhesive film for microcup type electronic paper comprising:
   (a) a thiol compound-containing free radical polymerizable composition and
   (b) a cation-initiated polymerizable composition comprising
      an epoxy compound having a softening point of less than 90° C. and
   wherein the (a) thiol compound-containing free radical polymerizable composition and the (b) cation-initiated polymerizable composition are present in a weight ratio ranging from 1:0.1 to 1:9.0, respectively.

2. The composition according to claim 1, wherein, in the (a) thiol compound-containing free radical polymerizable composition, the polyene compound has at least two carbon-carbon double bonds.

3. The composition according to claim 1, wherein the thiol compound is a polythiol compound having at least two —SH functional groups.

4. The composition according to claim 1, wherein the thiol compound comprises at least one selected from among bis(mercaptomethyl)-1,4-dithiane, bis(mercaptoethyl)sulfide, bis(mercaptoethyl)disulfide, 1,2-bis(mercaptoethyl)thio-3-mercaptopropane, pentaerythritol tetrakismercaptoacetate, pentaerythritol tetrakis(3-mercaptopropionate), trimethylolpropane trismercaptoacetate, trimethylolpropane trismercaptopropionate and trimercaptopropane, and tris[(3-mercaptopropionyloxy)-ethyl]isocyanurate.

5. The composition according to claim 2, wherein the polyene compound comprises at least one selected from among triallyl isocyanurate, diallyl adipate, diallyl phthalate, glycerin diallyl ether, trimethylolpropane diallyl ether, pentaerythritol, and diallyl ether, which are allyl alcohol derivatives.

6. The composition according to claim 2, wherein the thermal initiator comprises at least one selected from among azo, peroxide, persulfate, and oxidation-reduction compounds.

7. The composition according to claim 2, wherein the (a) thiol compound-containing free radical polymerizable composition comprises 10 parts by weight to 90 parts by weight of the thiol compound and 90 parts by weight to 10 parts by weight of the polyene compound based on 100 parts by weight of the (a) thiol compound-containing free radical polymerizable composition, and 0.1 parts by weight to 10 parts by weight of the thermal initiator based on 100 parts by weight of a mixture of the thiol and polyene compounds.

8. The composition according to claim 1, wherein the cationic polymerization initiator is an aromatic iodonium or sulfonium salt containing a metal halide anion.

9. The composition according to claim 8, wherein the metal halide anion comprises at least one selected from among $BF_4^-$, $PF_6^-$, $AsF_6^-$, and $SbF_6^-$.

10. The composition according to claim 1, wherein the (b) cation-initiated polymerizable composition comprises 0.1 parts by weight to 10 parts by weight of the cationic polymerization initiator based on 100 parts by weight of the epoxy compound.

11. An adhesive film for electronic paper comprising an adhesive layer formed thereon, the adhesive layer comprising the composition according to claim 1.

* * * * *